(12) United States Patent
Wu et al.

(10) Patent No.: US 9,587,693 B2
(45) Date of Patent: Mar. 7, 2017

(54) DISC BRAKE

(71) Applicant: BWI (SHANGHAI) CO., LTD., Pudong, Shanghai (CN)

(72) Inventors: Guangyu Wu, Shanghai (CN); Chuanliang Geng, Shanghai (CN); Mike Martyniak, Canton, MI (US)

(73) Assignee: BWI (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/799,294

(22) Filed: Jul. 14, 2015

(65) Prior Publication Data
US 2016/0153509 A1   Jun. 2, 2016

(30) Foreign Application Priority Data

Nov. 27, 2014   (CN) .......................... 2014 1 0706585

(51) Int. Cl.
| | | |
|---|---|---|
| *F16D 65/18* | (2006.01) | |
| *F16D 55/226* | (2006.01) | |
| *F16D 55/00* | (2006.01) | |
| *F16D 125/40* | (2012.01) | |
| *F16D 121/14* | (2012.01) | |
| *F16D 125/36* | (2012.01) | |
| *F16D 125/64* | (2012.01) | |

(52) U.S. Cl.
CPC ......... *F16D 65/183* (2013.01); *F16D 55/226* (2013.01); *F16D 2055/0016* (2013.01); *F16D 2121/14* (2013.01); *F16D 2125/36* (2013.01); *F16D 2125/40* (2013.01); *F16D 2125/64* (2013.01)

(58) Field of Classification Search
CPC .... F16D 65/18; F16D 55/225; F16D 2125/40; F16D 2055/0016
USPC .................... 188/72.8, 72.1, 72.6, 72.7, 72.9
See application file for complete search history.

(56) References Cited

U.S. PATENT DOCUMENTS 3,851,737 A * 12/1974 Hewins ................. F16D 65/567
188/106 F
4,278,152 A * 7/1981 Tosi ........................ F16D 65/18
188/196 BA
5,060,765 A * 10/1991 Meyer ..................... F16D 65/18
188/106 F
(Continued)

FOREIGN PATENT DOCUMENTS

| CN | 1200087 A | 11/1998 |
|---|---|---|
| CN | 1580602 A | 2/2005 |

(Continued)

OTHER PUBLICATIONS

German Office Action and English Translation, Dated Jan. 26, 2016, 15 Pages.
(Continued)

*Primary Examiner* — Thomas J Williams
*Assistant Examiner* — Mariano Sy
(74) *Attorney, Agent, or Firm* — Dickinson Wright PLLC

(57) ABSTRACT

A disc brake includes a friction pad, a piston, a thrust nut, a ball and a thrust shaft orderly connected from left to right. An outer surface of the thrust nut is provided with at least one protruded portion, and an inner wall surface of a brake housing is provided with a groove matched with the protruded portion.

8 Claims, 10 Drawing Sheets

(56) References Cited

U.S. PATENT DOCUMENTS

| | | | | |
|---|---|---|---|---|
| 5,482,145 | A * | 1/1996 | Miyashita | F16D 55/224 188/106 F |
| 5,697,475 | A | 12/1997 | Le Deit et al. | |
| 6,158,558 | A * | 12/2000 | Bill | F16D 65/18 188/162 |
| 6,264,010 | B1 * | 7/2001 | Doll | F16D 65/18 188/71.9 |
| 6,659,236 | B1 * | 12/2003 | Clark | F16D 65/18 188/196 V |
| 6,749,044 | B2 * | 6/2004 | Boisseau | F16D 65/18 188/72.7 |
| 8,069,961 | B2 * | 12/2011 | Watada | F16D 65/18 188/71.9 |
| 8,302,741 | B2 * | 11/2012 | Chen | F16D 65/18 188/71.8 |
| 9,038,788 | B2 * | 5/2015 | Vinck | F16D 65/183 188/72.6 |
| 2014/0262635 | A1 * | 9/2014 | Vinck | F16D 55/226 188/72.6 |

FOREIGN PATENT DOCUMENTS

| | | |
|---|---|---|
| CN | 204253676 U | 4/2015 |
| DE | 19628804 A1 | 1/1988 |
| DE | 69502411 T2 | 11/1998 |
| DE | 60033843 T2 | 11/2007 |
| EP | 0249522 A1 | 12/1987 |
| JP | 2004340166 A | 12/2004 |
| JP | 5002291337 A | 10/2005 |
| JP | 2008223808 A | 9/2008 |
| JP | 2011214647 A | 10/2011 |
| WO | 0118423 A1 | 3/2001 |
| WO | 0134991 A1 | 5/2001 |

OTHER PUBLICATIONS

The State Intellectual Property Office of China Office Action and Search Report, Dated May 11, 2016; 11 Pages.

The State Intellectual Property Office of China; Second Office Action Issued Nov. 14, 2016; Seven Pages.

* cited by examiner

US 9,587,693 B2

DISC BRAKE

CROSS-REFERENCE TO RELATED APPLICATION

This application claims priority to Chinese Patent Application No. 201410706585.9, filed on Nov. 27, 2014 before the State Intellectual Property Office of the P.R.C, which is hereby incorporated by reference in its entirety.

FIELD OF THE INVENTION

The present disclosure relates to the field of automobile braking device, and particularly, to a disc brake.

BACKGROUND OF THE INVENTION

In order that the braking forces are more ideally distributed to the front and rear wheels of a passenger vehicle, the disc brake is increasingly widely used for the front and rear wheels. But the existing disc brake has three shortages: 1) the parking requires a large displacement of the cable; 2) the effective life of parking is short; and 3) the part cost is high.

The conventional disc brake is illustrated in FIG. 1. During parking, the cable pulls a parking lever 21, and a thrust shaft 22 is rotated along with the parking lever. When the thrust shaft 22 is rotated, the thrust shaft 22 is fitted with a ball 24 due to a ramp structure of the bottom of the thrust shaft 22. The ball 24 rolls upward to the ramp of the thrust shaft 22. Similarly, a thrust nut 25 fitted with the ball 24 at the other end also has a bottom in the form of a ramp structure. The ball 24 rolls upward to the ramp of the thrust shaft 22, and also rolls upward to the ramp of the thrust nut 25 at the same time, thus the thrust nut 25 bears the axial pressure and the rotation torque simultaneously. The thrust nut 25 is mounted in an anti-rotation frame 23 and is prevented to rotate by the anti-rotation frame 23. The anti-rotation frame 23 is mounted in a brake housing 26 and is prevented to rotate by the brake housing 26. The thrust nut 25 transfers an axial pressure to an adjusting bolt 27, the adjusting bolt 27 transfers the pressure to a piston 28, the piston 28 transfers the pressure to a friction pad 29, and the friction pad 29 applies a pressure to the brake disc to prevent a rotation of the brake disc, thereby achieving a parking effect.

In the conventional disc brake, theoretically the thrust nut 25 is prevented from rotating completely by the anti-rotation frame 23. But in practice, due to the part machining tolerance, there is a gap A between the thrust nut 25 and the anti-rotation frame 23 as illustrated in FIGS. 2-3, and there is a gap B between the anti-rotation frame 23 and the brake housing 26 as illustrated in FIGS. 4-5. When the cable starts to pull the parking lever 21, the thrust nut 25 is rotated for some extent due to the existence of the gaps A and B. As a result, the displacement of the cable required by the parking is increased, and the parking efficiency is decreased.

SUMMARY OF THE INVENTION

The present disclosure employs the following technical solution: a disc brake, comprising a friction pad, a piston, a thrust nut, a ball and a thrust shaft orderly connected from left to right, wherein the disc brake further comprises a brake housing that sheathes the piston and the thrust nut, an outer surface of the thrust nut directly contacts an inner wall surface of the brake housing, the outer surface of the thrust nut is provided with at least one protruded portion, the inner wall surface of the brake housing is provided with a groove matched with the protruded portion, and the thrust nut is only axially movable in the brake housing.

BRIEF DESCRIPTION OF THE DRAWINGS

The disc brake of the present disclosure will be further described in details with reference to the drawings.

DETAILED DESCRIPTION OF THE PREFERRED EMBODIMENTS

Figure 1:
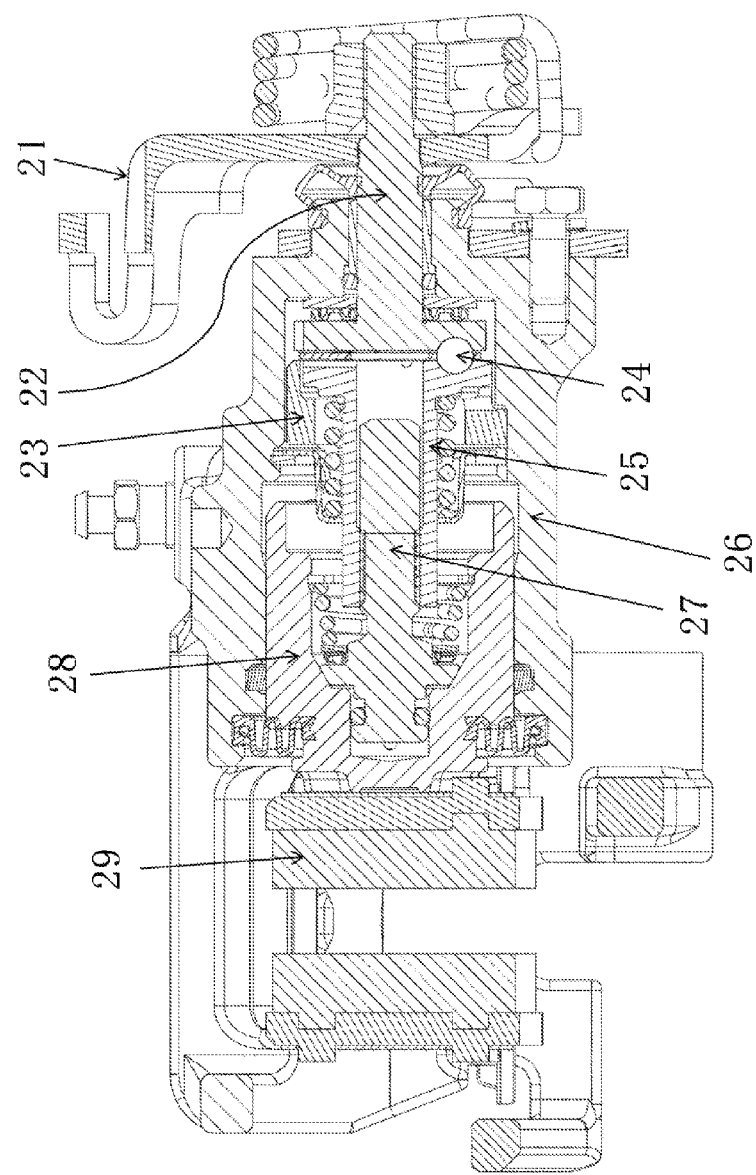
FIG. 1 is a structure diagram of a conventional disc brake.
Figure 2:
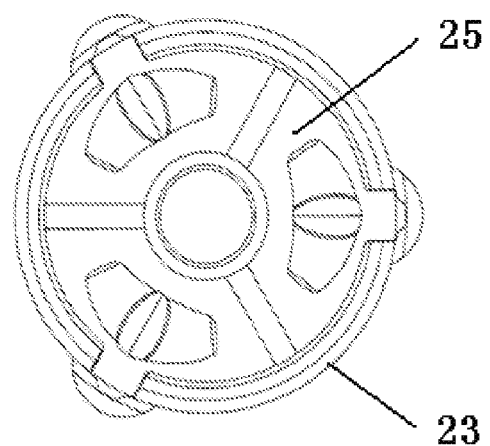
FIG. 2 is a schematic diagram of a fitting between a thrust nut and an anti-rotation frame in a conventional disc brake.
Figure 3:
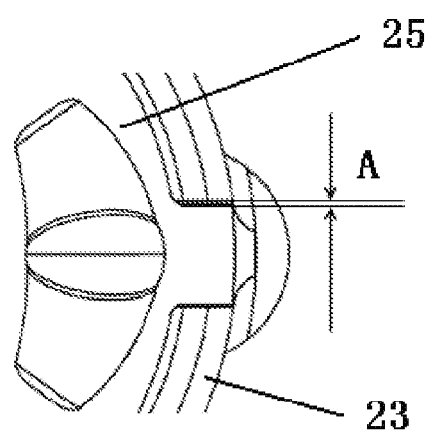
FIG. 3 is an enlarged diagram of the fitted portions of the thrust nut and the anti-rotation frame in FIG. 2.
Figure 4:
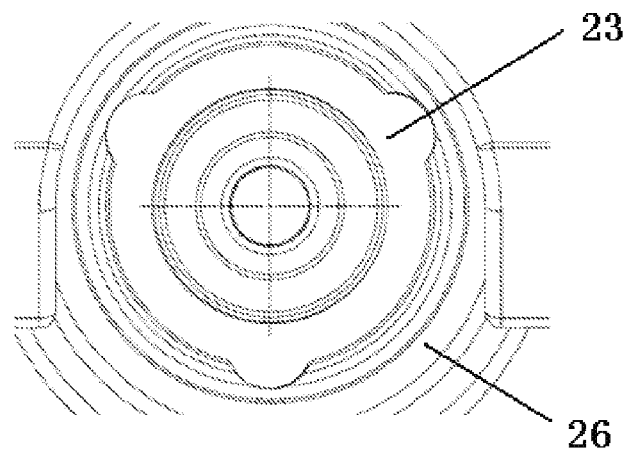
FIG. 4 is a schematic diagram of a fitting between an anti-rotation frame and a brake housing in a conventional disc brake.
Figure 5:
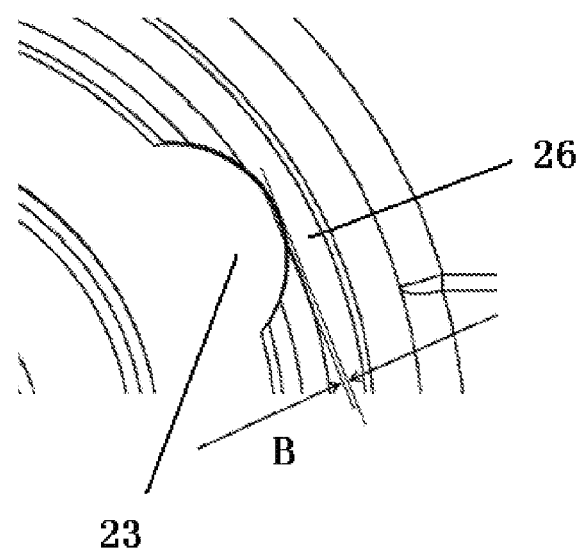
FIG. 5 is an enlarged diagram of the fitted portions of the anti-rotation frame and the brake housing in FIG. 4.

In order to solve the technical problem that the parking efficiency of the existing disc brake is low, the present disclosure proposes a disc brake, wherein a thrust nut of the disc brake is prevented to rotate directly through a brake housing. After the anti-rotation frame is cancelled, the thrust nut is mounted to fit with the brake housing directly, and gap C existing between the thrust nut and the brake housing is smaller than gap A between the thrust nut and the anti-rotation frame of the conventional calipers+gap B between the anti-rotation frame and the brake housing. Thus, when the cable starts to pull the parking lever, the rotation amount of the thrust nut is decreased, the displacement of the cable required by the parking is reduced, and the parking efficiency is improved. The cost of the brake is reduced due to the cancellation of the anti-rotation frame.

In order to solve the technical problem, the present disclosure employs the following technical solution: a disc brake, comprising a friction pad, a piston, a thrust nut, a ball and a thrust shaft orderly connected from left to right, wherein the disc brake further comprises a brake housing sheathes the piston and the thrust nut, an outer surface of the thrust nut directly contacts an inner wall surface of the brake housing, the outer surface of the thrust nut is provided with at least one protruded portion, the inner wall surface of the brake housing is provided with a groove matched with the protruded portion, and the thrust nut is only axially movable in the brake housing.

In one embodiment, one end of the thrust nut is provided with a flange, and three protruded portions are disposed on a peripheral surface of the flange and uniformly distributed in the circumferential direction of the flange.

In one embodiment, a projection of the protruded portion on a plane perpendicular to an axis of the thrust nut is an isosceles trapezoid.

In one embodiment, one end of the thrust shaft is provided inside the brake housing, the other end of the thrust shaft is provided outside the brake housing, and the other end of the thrust shaft is provided with a parking lever, which includes a flat plate whose edge has a bent portion for connecting a parking cable, the bent portion being directly connected to the edge of the flat plate, one end of the thrust shaft being located in the flat plate, and the flat plate being perpendicular to an axis of the thrust shaft.

In one embodiment, a screw is provided below the thrust shaft and fixedly connected to the brake housing, a torsion spring is provided below the parking lever for resetting the same, one end of the torsion spring is fixedly connected to the screw, and the other end of the torsion spring is fixedly connected to the parking lever.

In one embodiment, the bent portion is located at an upper portion of the flat plate, an opening is provided at a lower portion of the flat plate, the torsion spring sheathes the screw, and the position of the opening is corresponding to those of the screw and the torsion spring.

In one embodiment, a parking support is further provided below the thrust shaft and fixedly connected to the brake housing through the screw; the parking support comprises a flat plate whose edge has a bent portion for fixation, and the bent portion is directly connected to the edge of the flat plate.

In one embodiment, the brake housing has a neck sheathing the thrust shaft, and the edge of the flat plate is further provided with an arc-shaped opening portion matched with the neck.

In one embodiment, a sealing member is provided between an outer end surface of the neck and the thrust shaft; the sealing member comprises a sealing tube and a sealing ring; the sealing ring is in the form of a conical tube, a top end of the conical tube being fixedly connected to the sealing tube, and a bottom end of the conical tube being contacting the outer end surface of the neck.

The present disclosure has the following beneficial effect: the thrust nut of the disc brake is prevented to rotate through the brake housing directly. After the anti-rotation frame is cancelled, the thrust nut is directly mounted and fitted with the brake housing, and gap C existing between the thrust nut and the brake housing is smaller than gap A between the thrust nut and the anti-rotation frame of the conventional calipers+gap B between the anti-rotation frame and the brake housing. Thus, when the cable starts to pull the parking lever, the rotation amount of the thrust nut is decreased, the displacement of the cable required by the parking is reduced, and the parking efficiency is improved. Meanwhile, the cost of the brake is also reduced due to the cancellation of the anti-rotation frame.

Figure 6:
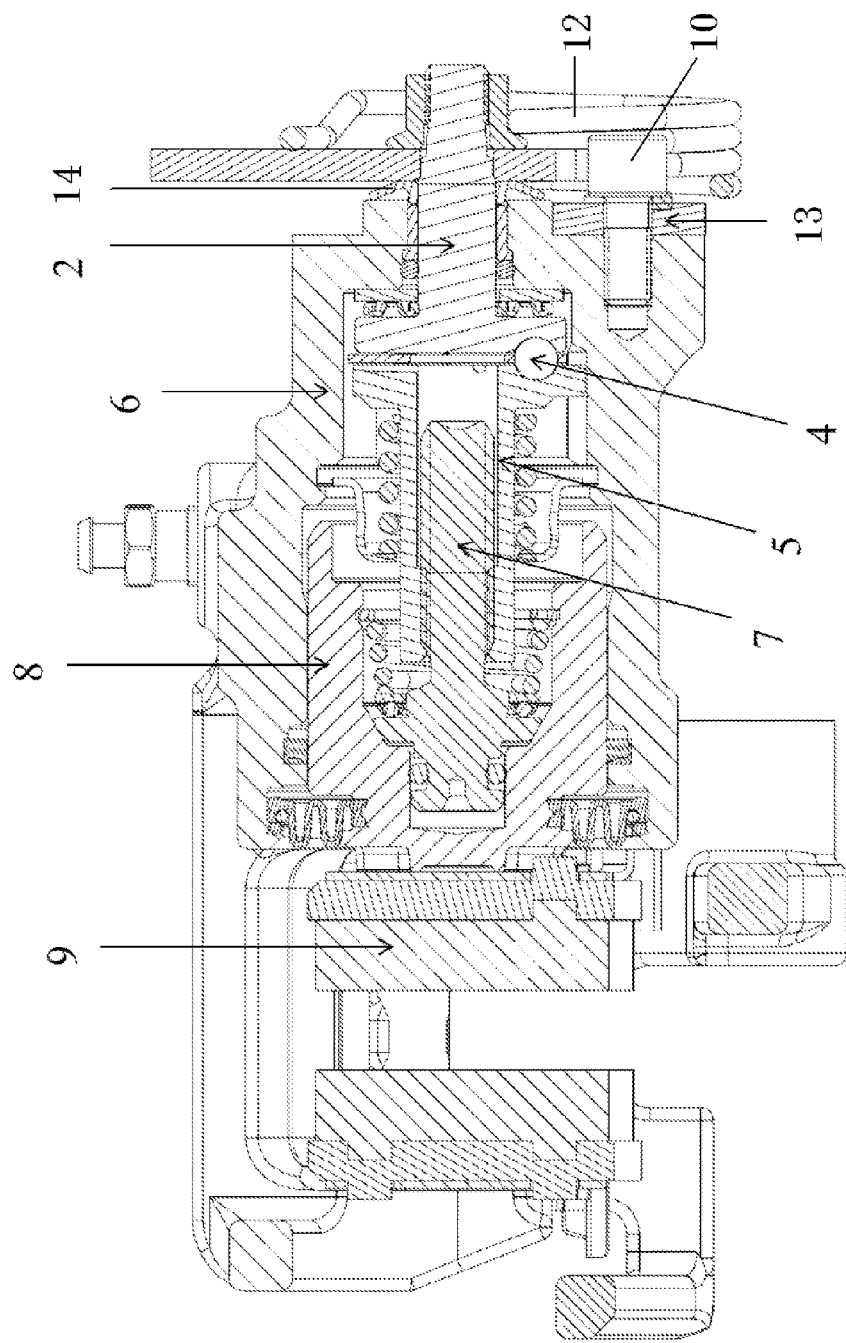
FIG. 6 is a structure diagram of a disc brake according to the present disclosure.

The disc brake of the present disclosure will be further described in details with reference to the drawings. A disc brake, comprising a friction pad 9, a piston 8, a thrust nut 5, a ball 4 and a thrust shaft 2 orderly connected from left to right, further comprising a brake housing 6 sheathes the piston 8 and the thrust nut 5, wherein an outer surface of the thrust nut 5 directly contacts an inner wall surface of the brake housing 6, the outer surface of the thrust nut 5 is provided with at least one protruded portion 51, the inner wall surface of the brake housing 6 is provided with a groove matched with the protruded portion 51, and the thrust nut 5 is only axially movable in the brake housing 6 rather than circumferentially rotatable, as illustrated in FIGS. 6 to 8.

As compared with the prior art, the anti-rotation frame 23 is cancelled, and the thrust nut 5 is directly mounted in the brake housing, i.e., the outer surface of the thrust nut 5 directly contacts the inner wall surface of the brake housing 6. After the cable pulls the parking lever 1, the thrust shaft 2 is rotated along with the parking lever 1. When the thrust shaft 2 is rotated, the thrust shaft 2 is fitted with a ball 4 due to a ramp structure of the bottom of the thrust shaft 2 (i.e, the left end surface of the thrust shaft 2 in FIG. 6) The ball 4 rolls upward to the ramp of the thrust shaft 2. Similarly, a thrust nut 5 fitted with the ball 4 at the other end also has a bottom (the right end surface of the thrust nut 5 in FIG. 6) in the form of a ramp structure. The ball 4 rolls upward to the ramp of the thrust shaft 2, and also rolls upward to the ramp of the thrust nut 5 at the same time, thus the thrust nut 5 bears the axial pressure and the rotation torque simultaneously. The thrust nut 5 is mounted in the brake housing 6 and is prevented to rotate by the brake housing 6 directly. The thrust nut 5 transfers an axial pressure to an adjusting bolt 7, the adjusting bolt 7 transfers the pressure to a piston 8, the piston 8 transfers the pressure to a friction pad 9, and the friction pad 9 applies a pressure to the brake disc to prevent a rotation of the brake disc, thereby achieving a parking effect.

Figure 7:
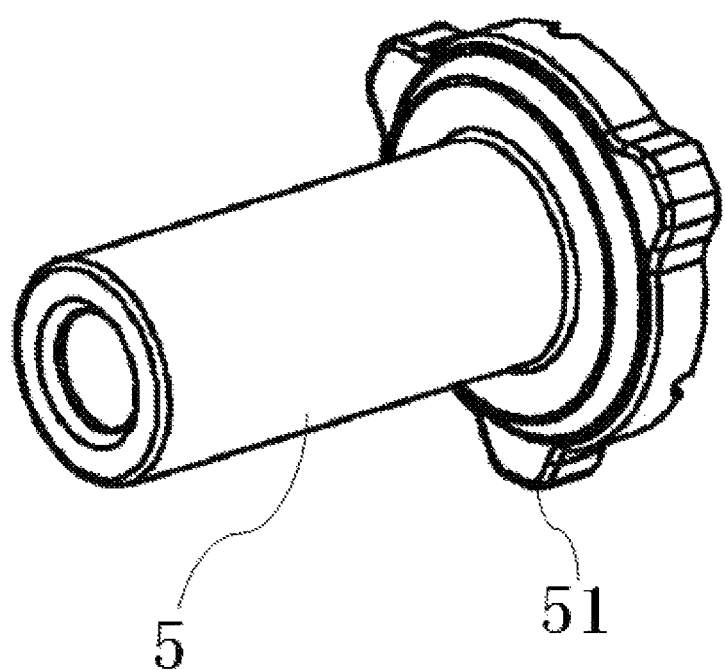
FIG. 7 is a structure diagram of a thrust nut in a disc brake according to the present disclosure.
Figure 8:
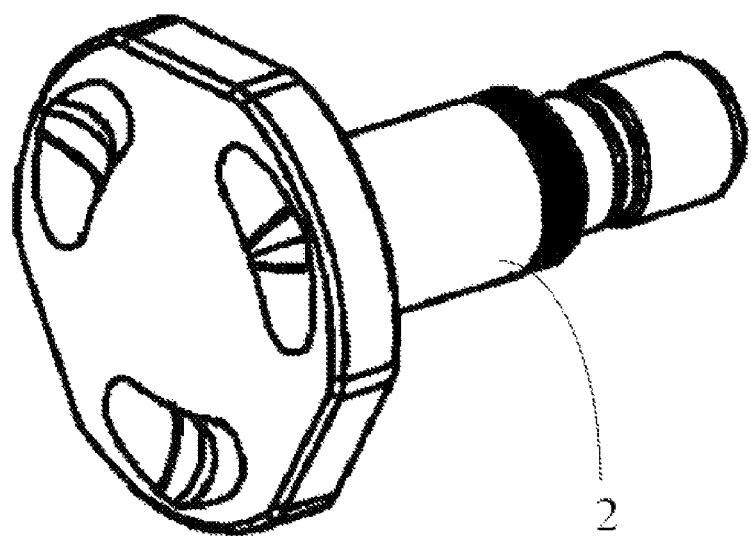
FIG. 8 is a structure diagram of a thrust shaft in a disc brake according to the present disclosure.
Figure 9:
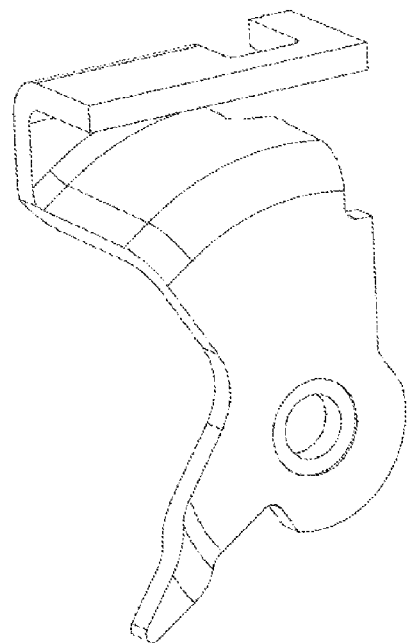
FIG. 9 is a structure diagram of a parking lever in a conventional disc brake.

Specifically, as illustrated in FIG. 7, the right end of the thrust nut 5 is provided with a flange, and three protruded portions 51 are disposed on a peripheral surface of the flange and uniformly distributed in a circumferential direction of the flange. A projection of the protruded portion 51 on a plane perpendicular to an axis of the thrust nut 5 is an isosceles trapezoid.

After the anti-rotation frame 23 is cancelled, the thrust nut 5 directly contacts the inner surface of the brake housing 6, and there is a circumferential gap C between the thrust nut 5 and the brake housing 6 (i.e., a gap between the protruded portion 51 of the thrust nut 5 and the groove of the brake housing 6 in the circumferential direction of the thrust nut 5). The gap C is smaller than gap A between the thrust nut 25 and the anti-rotation frame 23 of the conventional calipers+gap B between the anti-rotation frame 3 and the brake housing 26, i.e., C<A+B, wherein C is 0.1 mm to 0.4 mm. Thus, when the cable starts to pull the parking lever 1, the rotation amount of the thrust nut 5 is decreased, the displacement of the cable required by the parking is reduced, and the parking efficiency is improved. Meanwhile, the cost of the brake is reduced due to the cancellation of the anti-rotation frame 3.

Figure 11:
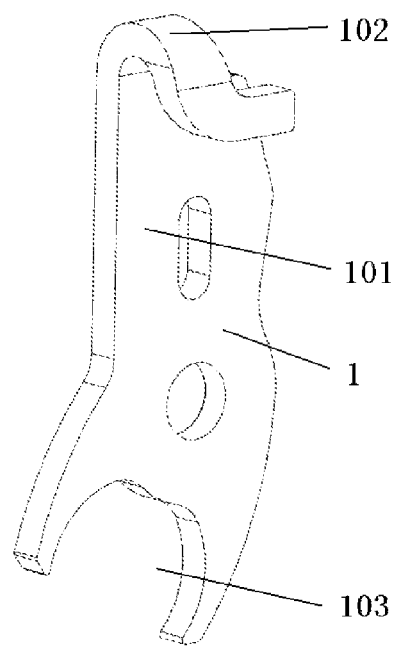
FIG. 11 is a structure diagram of a parking lever in a disc brake according to the present disclosure.

One end of the thrust shaft 2 is provided inside the brake housing 6, the other end of the thrust shaft 2 is provided outside the brake housing 6, and the other end of the thrust shaft 2 is provided with the parking lever 1. In order to reduce the bending moment of the disc brake, the parking lever 1 includes a flat plate 101 whose edge has a bent portion 102 for connecting a parking cable, the bent portion 102 is directly connected to the edge of the flat plate 101, one end of the thrust shaft 2 is located in the flat plate 101, and the flat plate 101 is perpendicular to the axis of the thrust shaft 2, as illustrated in FIGS. 11 and 12.

Figure 10:
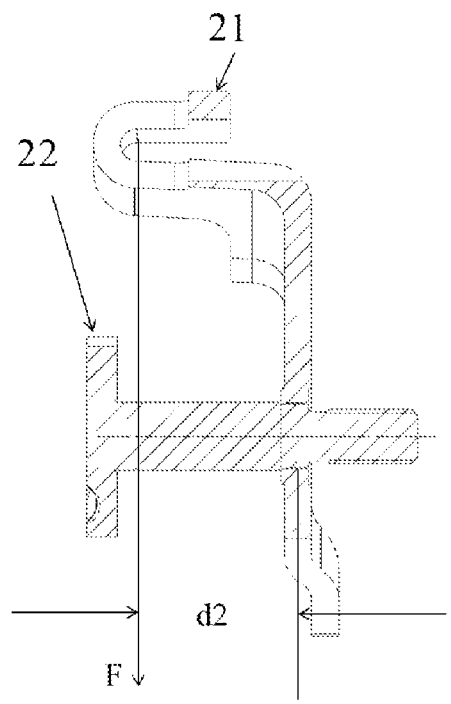
FIG. 10 is a moment diagram of a parking lever in a conventional disc brake.
Figure 12:
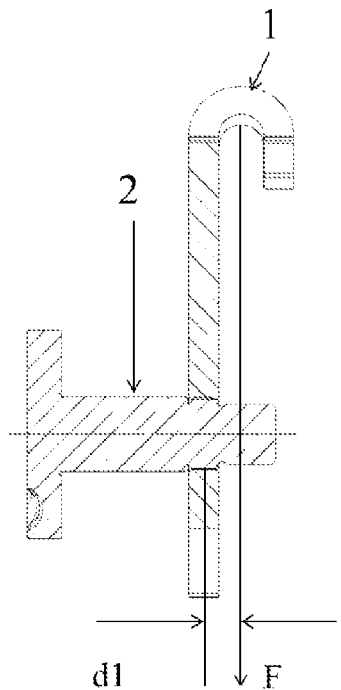
FIG. 12 is a moment diagram of a parking lever in a disc brake according to the present disclosure.

As illustrated in FIGS. 9 to 12, after the shape of the parking lever 1 is improved, the parking lever 1 applies a bending moment and a torque to the thrust shaft 2 simultaneously while the parking cable pulls the parking lever 1. The bending moment achieves no benefit while having a negative impact on the life of the thrust shaft 2. After the shape of the parking lever 1 is improved, the distance from the connection position between the cable and the parking lever 1 to the connection position between the parking lever 1 and the thrust shaft 2 is decreased (as illustrated in FIGS. 10 and 12, it is decreased from d2 to d1), thereby reducing the force arm of the bending moment and then reducing the bending moment (M2 is reduced to M1, M2=F×d2, M1=F×d1). The improvement also reduces the part material and the cost.

A screw 10 is provided below the thrust shaft 2 and fixedly connected to the brake housing 6. A torsion spring 12 is provided below the parking lever 1 for resetting the same. One end of the torsion spring 12 is fixedly connected to the screw 10, and the other end of the torsion spring 12 is fixedly connected to the parking lever 1. The bent portion 102 is located at the upper portion of the flat plate 101, and an opening 103 is provided at the lower portion of the flat plate 101. The torsion spring 12 sheathes the screw 10. The position of the opening 103 is corresponding to those of the screw 10 and the torsion spring 102.

Figure 13:
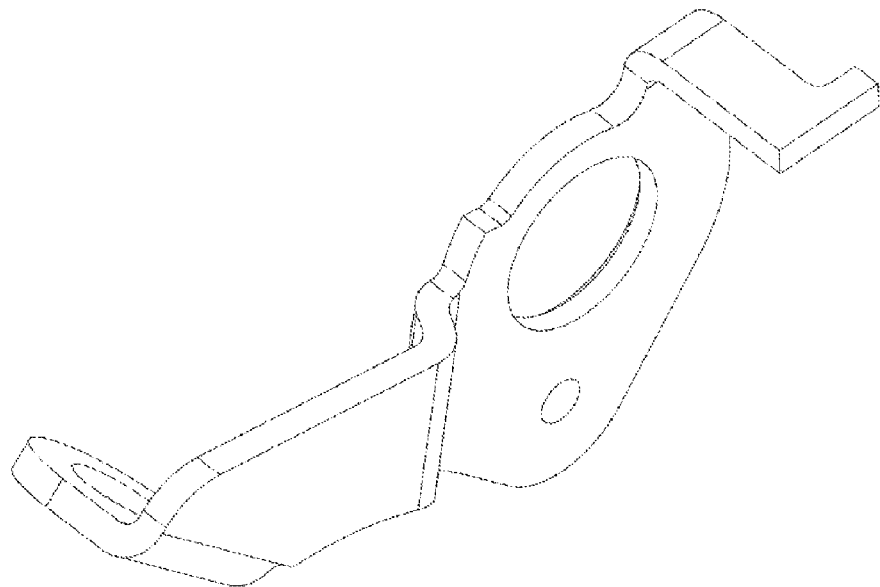
FIG. 13 is a structure diagram of a parking support in a conventional disc brake.
Figure 14:
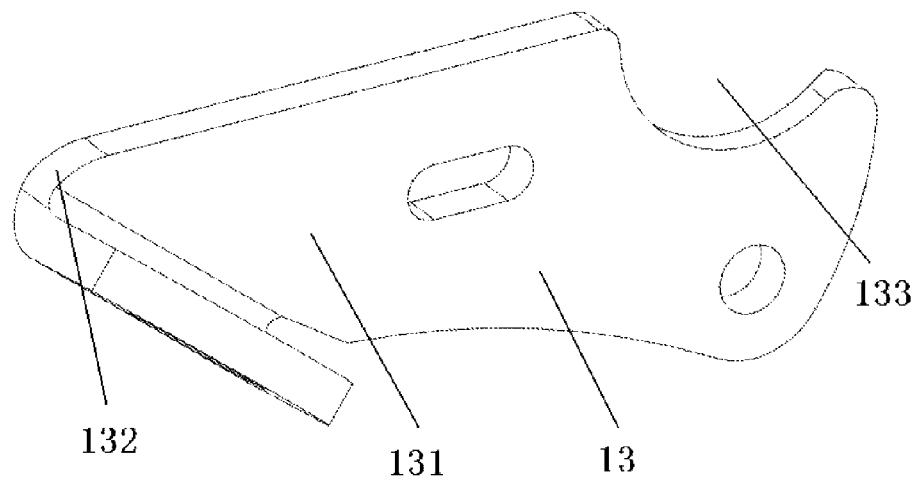
FIG. 14 is a structure diagram of a parking support in a disc brake according to the present disclosure.
Figure 15:
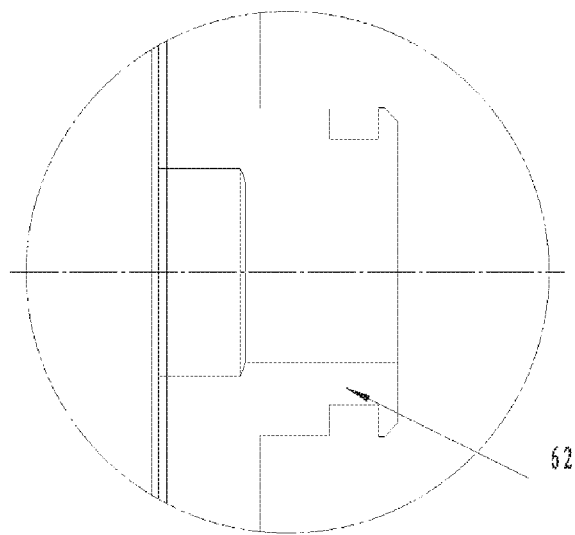
FIG. 15 is a structure diagram of a neck in a conventional disc brake.
Figure 16:
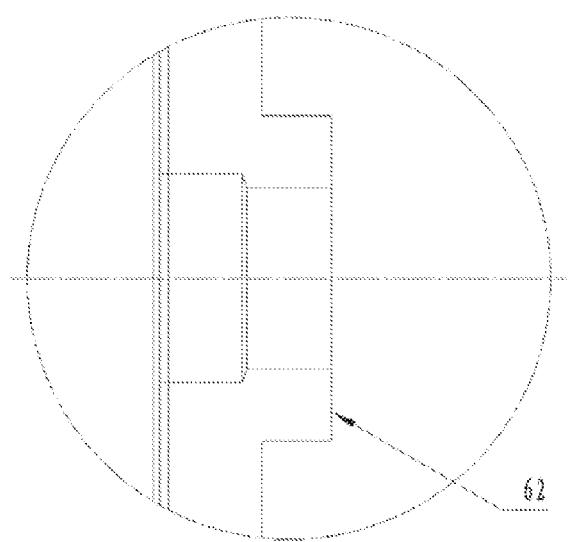
FIG. 16 is a structure diagram of a neck in a disc brake according to the present disclosure.
Figure 17:
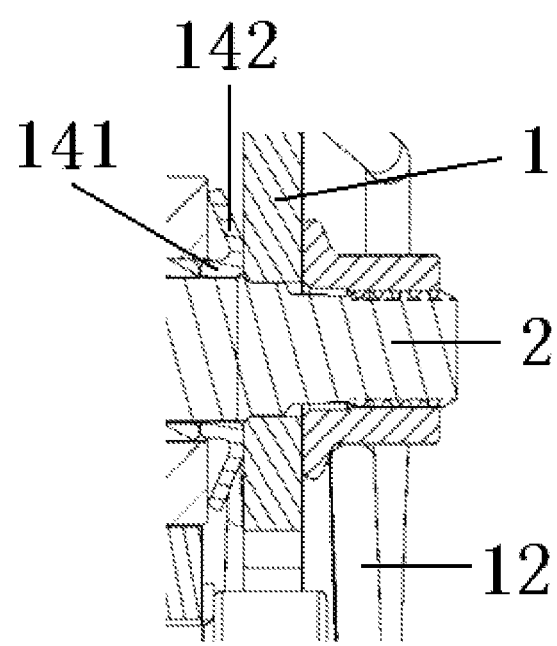
FIG. 17 is a structure diagram of a sealing element in a disc brake according to the present disclosure.

A parking support 13 is further provided below the thrust shaft 2 and fixedly connected to the brake housing 6 through the screw 10. The parking support 13 includes a flat plate 131 whose edge has a bent portion 132 for fixation, and the bent portion 132 is directly connected to the edge of the flat plate 131, as illustrated in FIGS. 13-14. The brake housing 6 has a neck 62 sheathing the thrust shaft 2. The edge of the flat plate 131 is further provided with an arc-shaped opening portion 133 matched with the neck 62.

As illustrated in FIGS. 6 and 15-17, a sealing member 14 is provided between the outer end surface of the neck 62 and the thrust shaft 2. The sealing member 14 has a sealing tube 141 and a sealing ring 142 sheathing the sealing tube 141. The sealing ring 142 is in the form of a conical tube, a top end of the conical tube is fixedly connected to the sealing tube 141, and a bottom end of the conical tube is contacting the outer end surface of the neck 62. The peripheral surface of the neck 62 has no annular groove. The design is simplified through the above structure, thereby improving the reliability and prolonging the service life of the disc brake.

The above descriptions are just specific embodiments of the present disclosure, and cannot be used to limit the implementation scope of the present disclosure. Therefore, any replacement with an equivalent component, or any equivalent change and modification within the patent protection scope of the present disclosure, shall be covered by the patent. In addition, in the present disclosure, the technical features or the technical solutions can be freely combined with each other, and the technical features can be freely combined with the technical solutions.

ELEMENT LIST

| Element Symbol | Element Name |
| --- | --- |
| 1, 21 | Parking Lever |
| 2, 22 | Thrust Shaft |
| 4, 24 | Ball |
| 5, 25 | Thrust Nut |

-continued

ELEMENT LIST

| Element Symbol | Element Name |
| --- | --- |
| 6, 26 | Brake Housing |
| 7, 27 | Adjusting Bolt |
| 8, 28 | Piston |
| 9, 29 | Friction Pad |
| 10 | Screw |
| 12 | Torsion Spring |
| 13 | Parking Support |
| 14 | Sealing Member |
| 23 | Anti-rotation Frame |
| 51 | Protruded Portion |
| 62 | Neck |
| 101, 131 | Flat Plate |
| 102, 132 | Bent Portion |
| 103, 133 | Opening |
| 141 | Sealing Tube |
| 142 | Sealing Ring |

The invention claimed is:

1. A disc brake, comprising a friction pad, a piston, a thrust nut, a ball and a thrust shaft orderly connected from left to right, wherein the disc brake further comprises a brake housing that sheathes the piston and the thrust nut, an outer surface of the thrust nut directly contacts an inner wall surface of the brake housing, the outer surface of the thrust nut is provided with at least one protruded portion, the inner wall surface of the brake housing is provided with a groove matched with the protruded portion, and the thrust nut is only axially movable in the brake housing;
wherein a parking lever is connected to the thrust shaft, the parking lever includes a flat plate with an edge having a bent portion for connecting to a parking cable, the bent portion being directly connected to the edge of the flat plate, one end of the thrust shaft being located in the flat plate, and the flat plate being perpendicular to an axis of the thrust shaft;
wherein a screw is provided below the thrust shaft and fixedly connected to the brake housing, a torsion spring is provided below the parking lever for resetting the parking lever, one end of the torsion spring is fixedly connected to the screw, and the other end of the torsion spring is fixedly connected to the parking lever; and
wherein the bent portion of the upper plate is located at an upper portion of the flat plate, an opening is provided at a lower portion of the flat plate, the torsion spring sheathes the screw, and wherein the screw extends through the opening of the lower portion of the flat plate.

2. The disc brake according to claim 1, wherein one end of the thrust nut is provided with a flange, and three protruded portions are disposed on a peripheral surface of the flange and uniformly distributed in a circumferential direction of the flange.

3. The disc brake according to claim 1, wherein a projection of the protruded portion on a plane perpendicular to an axis of the thrust nut is an isosceles trapezoid.

4. The disc brake according to claim 1, wherein one end of the thrust shaft is provided inside the brake housing, the other end of the thrust shaft is provided outside the brake housing and is connected to the parking lever.

5. The disc brake according to claim 1, wherein a parking support is further provided below the thrust shaft and fixedly connected to the brake housing through the screw; the parking support comprises a flat plate whose edge has a bent portion for fixation, and the bent portion is directly connected to the edge of the flat plate.

6. The disc brake according to claim 5, wherein the brake housing has a neck sheathing the thrust shaft, and the edge of the flat plate is further provided with an arc-shaped opening portion matched with the neck.

7. The disc brake according to claim 6, wherein a sealing member is provided between an outer end surface of the neck and the thrust shaft; the sealing member comprises a sealing tube and a sealing ring; the sealing ring is in the form of a conical tube, a top end of the conical tube being fixedly connected to the sealing tube, and a bottom end of the conical tube being contacting the outer end surface of the neck.

8. The disc brake according to claim 1, wherein the screw includes a shaft portion and a head portion, and wherein the torsion spring encircles and sheathes the head portion of the screw.

* * * * *